(12) United States Patent
Wang et al.

(10) Patent No.: US 11,847,049 B2
(45) Date of Patent: Dec. 19, 2023

(54) PROCESSING SYSTEM THAT INCREASES THE MEMORY CAPACITY OF A GPGPU

(71) Applicant: Alibaba Damo (Hangzhou) Technology Co., Ltd., Hangzhou (CN)

(72) Inventors: Yuhao Wang, Hangzhou (CN); Dimin Niu, Hangzhou (CN); Yijin Guan, Hangzhou (CN); Shengcheng Wang, Hangzhou (CN); Shuangchen Li, Hangzhou (CN); Hongzhong Zheng, Hangzhou (CN)

(73) Assignee: Alibaba Damo (Hangzhou) Technology Co., Ltd, Zhejiang Province (CN)

( * ) Notice: Subject to any disclaimer, the term of this patent is extended or adjusted under 35 U.S.C. 154(b) by 0 days.

(21) Appl. No.: 17/581,728

(22) Filed: Jan. 21, 2022

(65) Prior Publication Data

US 2023/0144693 A1 May 11, 2023

(30) Foreign Application Priority Data

Nov. 8, 2021 (CN) .......................... 202111312448.3

(51) Int. Cl.
*G06F 13/40* (2006.01)
*G06F 13/16* (2006.01)
*G06F 12/06* (2006.01)
*G06F 12/02* (2006.01)

(52) U.S. Cl.
CPC ...... *G06F 12/0238* (2013.01); *G06F 12/0653* (2013.01); *G06F 13/1668* (2013.01); *G06F 13/4068* (2013.01)

(58) Field of Classification Search
CPC ............ G06F 12/0238; G06F 12/0653; G06F 13/1668; G06F 13/4068
USPC .......................................................... 711/154
See application file for complete search history.

(56) References Cited

U.S. PATENT DOCUMENTS

| | | | | |
|---|---|---|---|---|
| 7,009,618 | B1* | 3/2006 | Brunner | G06F 12/063 345/557 |
| 7,680,117 | B1* | 3/2010 | Kumar | H04L 45/54 370/392 |
| 7,779,197 | B1* | 8/2010 | Norrie | G06F 13/4022 710/316 |
| 8,116,320 | B2* | 2/2012 | Polland | H04L 49/00 370/389 |
| 9,146,890 | B1* | 9/2015 | Brown | G06F 13/4022 |
| 11,321,179 | B1* | 5/2022 | Xu | G06F 11/1441 |
| 2007/0106826 | A1* | 5/2007 | Chia | G06F 13/36 710/113 |
| 2009/0019237 | A1* | 1/2009 | Kwon | G06F 15/167 711/E12.008 |
| 2014/0181457 | A1* | 6/2014 | Hsu | G06F 11/2094 711/206 |
| 2015/0117448 | A1* | 4/2015 | Winter | H04L 45/48 370/392 |
| 2017/0046295 | A1* | 2/2017 | Schwemmer | G06F 13/4022 |
| 2018/0300265 | A1* | 10/2018 | Roberts | G11C 5/02 |

(Continued)

*Primary Examiner* — Christopher B Shin

(57) ABSTRACT

The total memory space that is logically available to a processor in a general-purpose graphics processing unit (GPGPU) module is increased to accommodate terabyte-sized amounts of data by utilizing the memory space in an external memory module, and by further utilizing a portion of the memory space in a number of other external memory modules.

20 Claims, 2 Drawing Sheets

(56) References Cited

U.S. PATENT DOCUMENTS

2020/0301873 A1\* 9/2020 Borikar ............... G06F 13/4022
2020/0403909 A1\* 12/2020 Kleyman ............ G06F 13/1668
2021/0133122 A1\* 5/2021 Guyer ................. G06F 12/0806

\* cited by examiner

PROCESSING SYSTEM THAT INCREASES THE MEMORY CAPACITY OF A GPGPU

CROSS-REFERENCE TO RELATED APPLICATIONS

This application claims priority to Chinese Patent Application No. 202111312448.3, filed on Nov. 8, 2021, which is incorporated herein by reference in its entirety.

BACKGROUND OF THE INVENTION

1. Field of the Invention

The present invention relates to a processing system and, more particularly, to a processing system that increases the memory capacity of a GPGPU.

2. Description of the Related Art

A graphics processing unit (GPU) is a well-known device that performs the computations necessary to populate a frame buffer which, in turn, is used to display an image on a screen. A central processing unit (CPU) offloads the task of populating the frame buffer, which can be computationally intensive, to the GPU, thereby freeing the CPU to perform other tasks in a timely manner.

A general-purpose graphics processing unit (GPGPU) is an extension of a GPU in that a GPGPU can be programmed to perform other computationally-intensive (non-graphics processing) operations. In artificial intelligence (AI) and machine learning applications, a CPU is often paired with a number of GPGPUs, e.g., 100 GPGPUs, that perform convolution type operations in parallel.

A GPGPU has a processor and a memory that is coupled to the processor. In many AI and machine learning applications, the GPGPU memory has to be very large and very fast. As a result, the GPGPU memory in an AI/machine learning setting is commonly implemented with a large and very fast memory known as a high bandwidth memory (HBM).

A typical HBM includes a number of dynamic random-access memory (DRAM) dies that are vertically stacked on top of each other to provide a large storage capacity, e.g., 4 GB, 24 GB, and 64 GB, with a small form factor. In addition, each DRAM die includes two 128-bit data channels to provide a high bandwidth.

One problem with current-generation GPGPUs is that when dealing with terabyte-sized workloads, such as with graph neural networks, recommendation systems, and database machine learning models with lots of parameters, the GPGPU suffers from poor performance since the memory capacity of the GPGPU memory (HBM) is so much less than a terabyte.

In addition, the maximum capacity of the GPGPU memory (HBM) is limited because it is increasingly more difficult to vertically stack dies on top of each other, thereby effectively limiting both the number of dies that can be stacked up to form an HBM and the maximum capacity of the HBM. In addition, each die in an HBM is often fabricated with the largest reticle, which limits the maximum size and capacity of the die.

Thus, since the GPGPU memory (HBM) suffers from a limited memory capacity when dealing with terabyte-sized workloads, there is a need to increase the capacity of the GPGPU memory.

SUMMARY OF THE INVENTION

The present invention increases the capacity of a GPGPU memory. The present invention includes a processing system that has a plurality of external memory units. Each of the plurality of external memory units has an extension memory that has a first plurality of memory addresses, and an interconnect circuit that has a second plurality of memory addresses. The interconnect circuit has an extension controller and a number of ports coupled to the extension controller. Each port of a first external memory unit is coupled to another external memory unit of the plurality of external memory units, and assigned a range of memory addresses within the second plurality of memory addresses. Each of the plurality of external memory units also has a memory control circuit coupled to the extension memory and the interconnect circuit. The memory control circuit receives a memory request having a memory address, and determines whether the memory address lies within the first plurality of memory addresses or within the second plurality of memory addresses. The memory control circuit also forwards the memory address to the extension memory when the memory address lies within the first plurality of memory addresses, and forwards the memory address to the interconnect circuit when the memory address lies within the second plurality of memory addresses. The extension controller of the interconnect circuit receives the memory address when the memory address lies within the second plurality of memory addresses, determines a port of the number of ports that was assigned the range of addresses that include the memory address, and forwards the memory address to the port.

The present invention further includes a method of operating a processing system. The method includes receiving a memory request having a memory address, and determining whether the memory address lies within a first plurality of memory addresses associated with an extension memory or within a second plurality of memory addresses associated with an interconnect circuit. The method further includes forwarding the memory address to the extension memory when the memory address lies within the first plurality of memory addresses, and forwarding the memory address to the interconnect circuit when the memory address lies within the second plurality of memory addresses. The method also includes receiving the memory address when the memory address lies within the second plurality of memory addresses; determining a port of a plurality of ports that was assigned a range of addresses that include the memory address; and forwarding the memory address to the port.

The present invention also includes a non-transitory computer-readable storage medium that has embedded therein program instructions, which when executed by one or more processors of a device, causes the device to execute a method that operates a processing system. The method includes receiving a memory request having a memory address, and determining whether the memory address lies within a first plurality of memory addresses associated with an extension memory or within a second plurality of memory addresses associated with an interconnect circuit. The method further includes forwarding the memory address to the extension memory when the memory address lies within the first plurality of memory addresses, and forwarding the memory address to the interconnect circuit when the memory address lies within the second plurality of memory addresses. The method also includes receiving the memory address when the memory address lies within the second plurality of memory addresses; determining a port of a plurality of ports that was assigned a range of addresses that include the memory address; and forwarding the memory address to the port.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

The accompanying drawings described herein are used for providing further understanding of the present application and constitute a part of the present application. Exemplary embodiments of the present application and the description thereof are used for explaining the present application and do not constitute limitations on the present application.

DETAILED DESCRIPTION OF THE INVENTION

Figure 1:
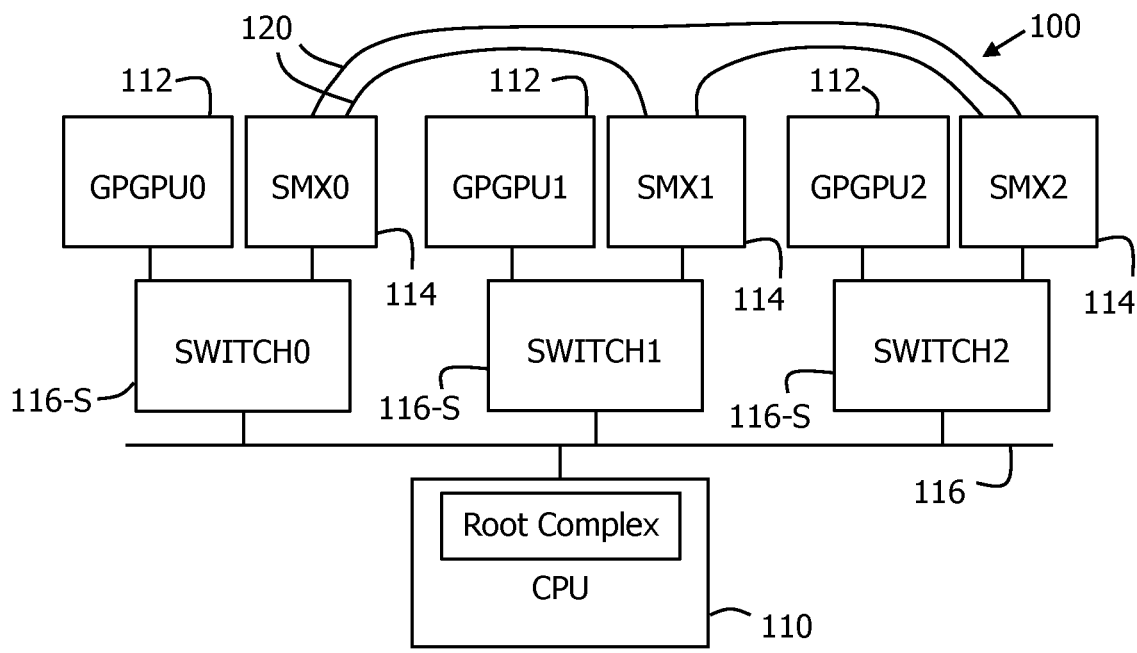
FIG. 1 is a block diagram illustrating an example of a processing system 100 in accordance with the present invention.

FIG. 1 shows a block diagram that illustrates an example of a processing system 100 in accordance with the present invention. As described in greater detail below, processing system 100 substantially increases the available memory space to accommodate terabyte sized workloads by utilizing a number of external memory modules that are coupled together and operated such that the available address space of a first external memory module includes a local address space that is physically located on the first external memory module, and an extended address space that is physically located on a second and other external memory modules.

As shown in FIG. 1, processing system 100 includes a central processing unit (CPU) module 110, a number of general-purpose graphics processing unit (GPGPU) modules 112, and a number of external memory (SMX) modules 114. In the present example, one CPU module, three GPGPU modules, and three SMX modules are illustrated for simplicity. Other numbers of CPU modules, GPGPU modules, and SMX modules can also be utilized and arbitrarily configured. In the present example, the SMX modules are identical.

As further shown in the FIG. 1 example, processing system 100 additionally includes a peripheral component interconnect express (PCIe) bus 116 that couples together CPU module 110, the GPGPU modules 112, and the SMX modules 114. Buses similar to PCIe bus 116 can alternately be used if supported by the CPU and GPGPU modules.

PCIe bus 116 includes a number of endpoints, a root complex, and a number of PCIe switches 116-S. In the present example, the GPGPU modules 112 and the SMX modules 114 are endpoints when receiving data, while the root complex, which is a discrete circuit on CPU module 110, performs address translation to identify one of the endpoints in a memory request. Each PCIe switch 116-S, in turn, lies between CPU module 110 and a number of devices.

In the present example, each GPGPU module 112 has a corresponding SMX module 114. The modules are coupled together by way of a PCIe switch 116-S, which allows messages between the modules to be directly forwarded, such as from the GPGPU module to the corresponding SMX module, and vice versa, without having to go through the root complex. Alternately, the PCIe switches 116-S can optionally be omitted such that the GPGPU modules 112 and the SMX modules 114 are directly coupled to the root complex in CPU module 110.

As additionally shown in the FIG. 1 example, processing system 100 further includes an interconnect structure 120 that couples each SMX module 114 to each of the other SMX modules 114. In the present example, interconnect structure 120 is implemented with fiber optics. As shown, interconnect structure 120 is not connected to CPU module 110 and the GPGPU modules 112. Although each SMX module 114 is shown directly coupled to each other SMX module 114, other topologies, such as a daisy chain (1-2, 2-3, 3-4), can alternately be used.

The memory in the SMX module, such as the SMX0 module, that corresponds with a GPGPU module, such as the GPGPU0 module, is an extension of the GPGPU memory. Portions of the memories in the other SMX modules, such as the SMX1 and SMX2 modules, are an extension of the memory in the SMX0 module. If each SMX module has a terabyte of extra capacity, then in the present three SMX module example the processor on a GPGPU no longer sees a HBM memory of, for example, 24 gigabytes, but instead can see a potential three-terabyte memory.

Figure 2:
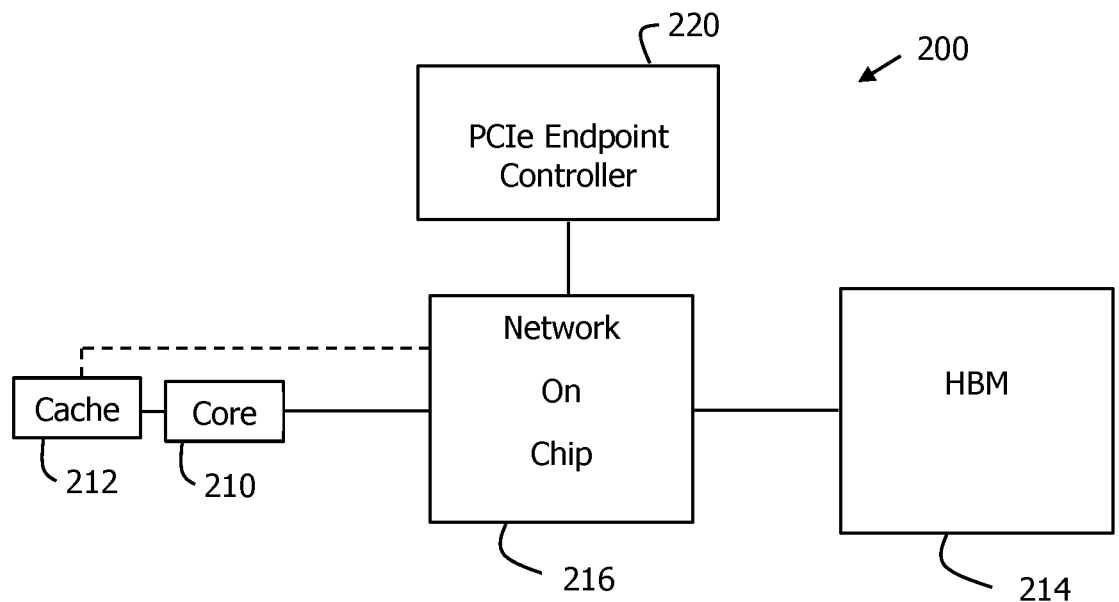
FIG. 2 is a block diagram illustrating an example of a general-purpose graphics processing unit (GPGPU) module 200 in accordance with the present invention.

FIG. 2 shows a block diagram that illustrates an example of a general-purpose graphics processing unit (GPGPU) module 200 in accordance with the present invention. Each GPGPU module 112 can be implemented with GPGPU module 200. As shown in FIG. 2, GPGPU module 200 includes a core 210, a local cache 212 (with one or more levels) that is coupled to core 210, and a GPGPU memory 214, such as a high bandwidth memory (HBM), that is coupled to core 210 and cache 212.

In operation, GPGPU memory 214 stores data (instructions and values) that are accessed by core 210. Cache 212 stores a copy of some of the more frequently accessed data that is stored in GPGPU memory 214. Core 210, in turn, executes the instructions and utilizes the values that are stored in cache 212 and GPGPU memory 214.

GPGPU module 200 also includes a network-on-chip (NoC) 216 that couples together core 210 and GPGPU memory 214 to provide a high bandwidth, high-speed communication path between core 210 and GPGPU memory 214. Cache 212 can also be coupled to local memory 214 via NoC 216. GPGPU module 200 further includes a PCIe endpoint controller 220 that is coupled to core 210 via NoC 216 to provide communication over a PCIe bus, such as PCIe bus 116.

Figure 3:
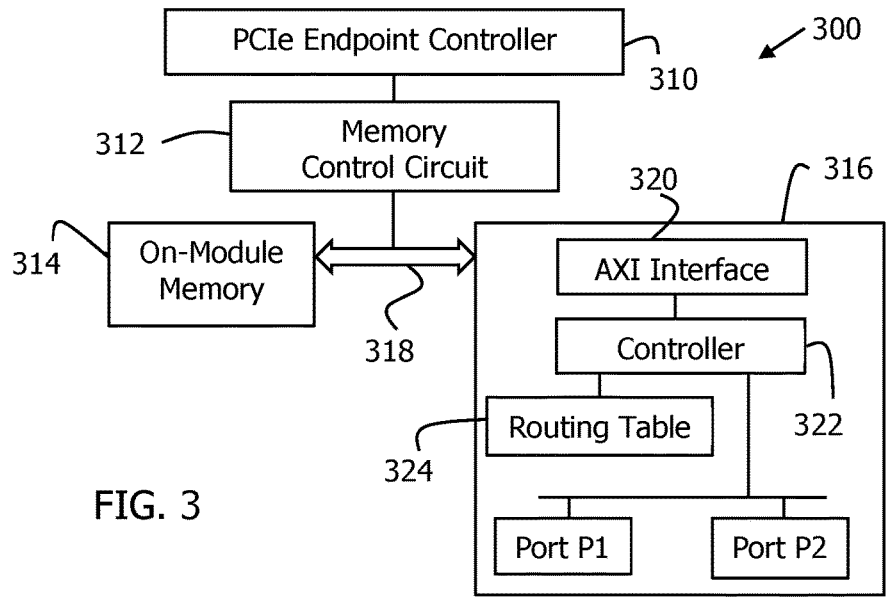
FIG. 3 is a block illustrating an example of an external memory (SMX) module 300 in accordance with the present invention.

FIG. 3 shows a block diagram that illustrates an example of an external memory (SMX) module 300 in accordance with the present invention. In the present example, each SMX module 114 can be implemented with SMX module 300. As shown in FIG. 3, SMX module 300 includes a PCIe endpoint controller 310 that receives data from and transmits data to a PCIe bus, such as PCIe bus 116, and a memory control circuit 312 that is coupled to PCIe endpoint controller 310 to control the movement of data into and out of the memory space of SMX module 300.

SMX module 300 also includes an on-module memory 314 with a local address space, which has a first number of memory addresses, and an interconnect circuit 316 that controls access to an interconnect structure, such as interconnect structure 120, to access an extended memory space, which has a second number of memory addresses. In the present example, interconnect circuit 316 is implemented with a memory-over-fabric (MoF) circuit. (Memory accesses over fiber optics are known as memory over fabric (MoF).)

SMX module 300 further includes a conventional advanced extensible interface (AXI) bus 318 that couples memory 314 and circuit 316 to memory control circuit 312. AXI bus 318 includes five channels between each AXI node (memory control circuit 312, memory 314, and circuit 316): a read address channel, a read data channel, a write address channel, a write data channel, and a write response channel. The AXI bus protocol supports multiple master and multiple slave devices.

The total memory space of SMX module 300 includes the local memory space of memory 314 that is physically located on SMX module 300, and an extended memory space that is physically located on one or more of the other SMX modules in the processing system. The combined on-module memory space and the off-module memory space allow SMX module 300 to have a logic memory range that is larger than its physical memory resources, with the off-module memory space being mapped to the memory space of other SMX modules. In the present example, each SMX module 300 only stores GPGPU instructions and values.

Interconnect circuit 316, in turn, includes an AXI interface 320, a controller 322 that is coupled to AXI interface 320, and a routing table 324 that is coupled to controller 322. AXI interface 320 receives data from and transmits data to AXI bus 318, while controller 322 controls the movement of data through interconnect circuit 316. In addition, interconnect circuit 316 includes a number of transmit/receive ports P1-Pn (optical in the present example) that are coupled to controller 322 and the other SMX modules in the processing system via the interconnect structure.

Figure 4:
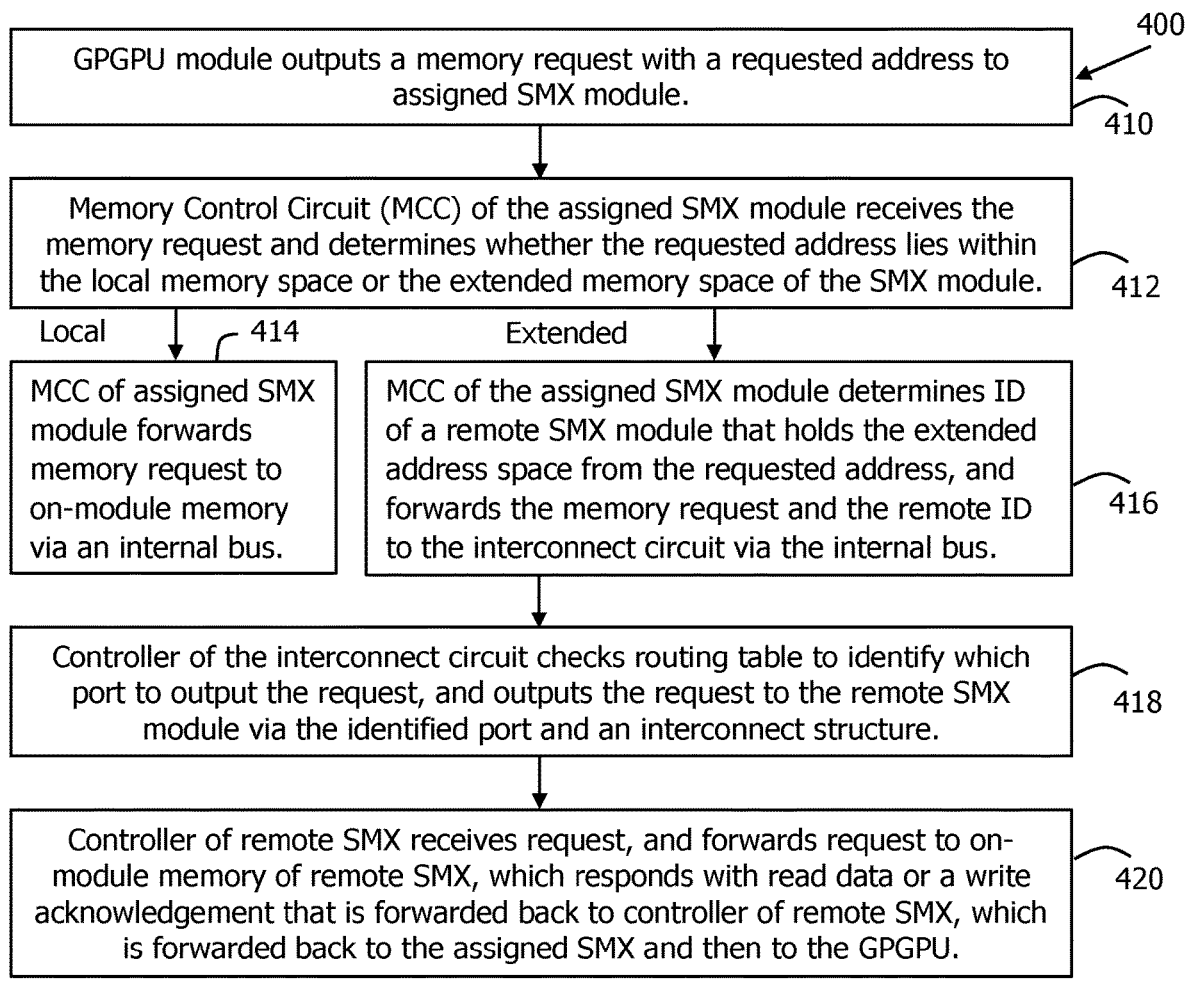
FIG. 4 is a flow chart illustrating an example of a method 400 of operating processing system 100 in accordance with the present invention.

FIG. 4 shows a flow chart that illustrates an example of a method 400 of operating processing system 100 in accordance with the present invention. As shown in FIG. 4, method 400 begins at 410 where a GPGPU module outputs a memory request with a requested address to an assigned SMX module, such as the SMX module that corresponds with the GPGPU module, which receives the requested address. In the present example, the GPGPU module only outputs memory requests to the SMX module that corresponds with the GPGPU module. The GPGPU module is unaware when the memory address is physically located on another SMX module.

Following this, method 400 moves to 412 where the memory control circuit of the assigned SMX module receives the memory request from the GPGPU module (by way of a PCIe switch or the root complex), and determines whether the requested address lies in the addresses associated with the local address space that is physically located on the assigned SMX module, or in the addresses associated with the extended address space that is physically located on one or more remote SMX modules.

When the requested address lies within the addresses associated with the local memory space, method 400 moves to 414 where the memory control circuit of the assigned SMX module forwards the memory request to the on-module memory of the assigned SMX module via an internal bus, such as an AXI bus. The on-module memory responds to the memory request by forwarding read data or a write acknowledgement via the internal bus back to the memory control circuit of the assigned SMX module, which forwards the read data or the write acknowledgement back the GPGPU module.

When the requested address lies within the addresses associated with the extended memory space of a remote SMX module, method 400 moves to 416 where the memory control circuit of the assigned SMX module determines the identity of a remote SMX module (that holds the addresses associated with the extended address space) from the requested address, and forwards the memory request and the remote identity to an interconnect circuit, such as interconnect circuit 316, via the internal bus.

Next, method 400 moves to 418 where the controller of the interconnect circuit, such as controller 322, of the assigned SMX module checks a routing table, such as routing table 324, to identify which port, such as port P1 or P2, to output the request, and outputs the memory request to the remote SMX module via the identified port and an interconnect structure, such as interconnect structure 120. As a result, a first GPGPU module can access data stored in the SMX module that corresponds with a second GPGPU module.

Following this, method 400 next moves to 420 where the controller of the interconnect circuit of the remote SMX module receives the memory request via a port of the remote SMX module, and then outputs the memory request to the on-module memory of the remote SMX module via an internal bus of the remote SMX module.

The on-module memory of the remote SMX module responds by forwarding read data or a write acknowledgement to the controller of the interconnect circuit of the remote SMX module via the internal bus of the remote SMX module, which forwards the read data or the write acknowledgement back to the controller of the interconnect circuit of the assigned SMX module via the interconnect structure and a port of the assigned SMX module.

The controller of the interconnect circuit of the assigned SMX module then forwards the read data or the write acknowledgement back to the memory control circuit of the assigned SMX module via the internal bus of the assigned SMX module, which forwards the read data or the write acknowledgement back the GPGPU module.

Each physical memory resource can be associated with multiple addresses, and each address dictates the data path. For example, GPGPU0 in FIG. 1 can address a request for a memory location in an extended memory by utilizing the address A+x, where A is the local memory space SMX0 and x is the extended memory space physically located in SMX1, and by next outputting the request by way of SWITCH0 to SMX0, which then passes the request on to SMX1 by way of interconnect 120.

Alternately, GPGPU0 can address a request for the memory location in the extended memory by utilizing address B, where B is physically located in the local memory space of SMX1, and by next outputting the request to SMX0 by way of SWITCH0, which passes the request on to the root complex of CPU 110, and then makes its way to SMX1 by way of SWITCH1.

The graph data of a graph neural network is partitioned and stored in the SMX modules. A GPGPU can access the graph data by peer-to-peer model (either by registering memory extension page tables to the GPGPU or utilizing a driver to manage the memory resources directly). Each GPGPU logically sees multiple copies of graphs that stays synchronized, where each device hosts one whole graph. Each GPGPU can access the graph data by using the best suitable address to dictate the route (e.g., for best performance all via the local PCI switch and fiber optic fabric).

One of the advantages of the present invention is that the present invention significantly increases the amount of memory space that is potentially available to a GPGPU, such as from the gigabytes of a HBM to multiple terabytes. Another advantage of the present invention is that the present invention virtualizes a memory space that is larger than what is physically present, thereby saving cost by tricking the GPGPU module to think the data is always in the assigned SMX module, so that all pairs can work together without too much congestion at the PCIe side. The present invention utilizes custom links which connect the interconnect circuits to gain additional bandwidth. In addition, the present invention provides graph data access across GPGPUs so a GPGPU can access data in other memory modules with knowing it as interconnect circuit 316 takes care of this internally. Although the extended memory space has latency associated with it, the latency is kept to a minimum by utilizing the PCIe switch and the fiber optic transmission.

Reference has now been made in detail to the various embodiments of the present disclosure, examples of which are illustrated in the accompanying drawings. While described in conjunction with the various embodiments, it will be understood that these various embodiments are not intended to limit the present disclosure. On the contrary, the present disclosure is intended to cover alternatives, modifications and equivalents, which may be included within the scope of the present disclosure as construed according to the claims.

Furthermore, in the preceding detailed description of various embodiments of the present disclosure, numerous specific details are set forth in order to provide a thorough understanding of the present disclosure. However, it will be recognized by one of ordinary skill in the art that the present disclosure may be practiced without these specific details or with equivalents thereof. In other instances, well-known methods, procedures, components, and circuits have not been described in detail so as not to unnecessarily obscure aspects of various embodiments of the present disclosure.

It is noted that although a method may be depicted herein as a sequence of operations for clarity, the described sequence of operations does not necessarily dictate the order of the operations. It should be understood that some of the operations may be skipped, performed in parallel, or performed without the requirement of maintaining a strict order of sequence.

The drawings showing various embodiments in accordance with the present disclosure are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the various embodiments in accordance with the present disclosure can be operated in any orientation.

Some portions of the detailed descriptions may be presented in terms of procedures, logic blocks, processing, and other symbolic representations of operations on data bits within a computer memory. These descriptions and representations are used by those skilled in the data processing arts to effectively convey the substance of their work to others skilled in the art.

In the present disclosure, a procedure, logic block, process, or the like, is conceived to be a self-consistent sequence of operations or instructions leading to a desired result. The operations are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "generating," "determining," "assigning," "aggregating," "utilizing," "virtualizing," "processing," "accessing," "executing," "storing," or the like, refer to the action and processes of a computer system, or similar electronic computing device or processor.

The processing system, or similar electronic computing device or processor manipulates and transforms data represented as physical (electronic) quantities within the computer system memories, registers, other such information storage, and/or other computer readable media into other data similarly represented as physical quantities within the computer system memories or registers or other such information storage, transmission or display devices.

The technical solutions in the embodiments of the present application have been clearly and completely described in the prior sections with reference to the drawings of the embodiments of the present application. It should be noted that the terms "first," "second," and the like in the description and claims of the present invention and in the above drawings are used to distinguish similar objects and are not necessarily used to describe a specific sequence or order. It should be understood that these numbers may be interchanged where appropriate so that the embodiments of the present invention described herein can be implemented in orders other than those illustrated or described herein.

The functions described in the present embodiment, if implemented in the form of a software functional unit and sold or used as a standalone product, can be stored in a computing device readable storage medium. Based on such understanding, a portion of the embodiments of the present application that contributes to the prior art or a portion of the technical solution may be embodied in the form of a software product stored in a storage medium, including a plurality of instructions for causing a computing device (which may be a personal computer, a server, a mobile computing device, or a network device, and so on) to perform all or part of the steps of the methods described in various embodiments of the present application. The foregoing storage medium includes: a USB drive, a portable hard disk, a read-only memory (ROM), a random-access memory (RAM), a magnetic disk, an optical disk, and the like, which can store program code.

The various embodiments in the specification of the present application are described in a progressive manner, and each embodiment focuses on its difference from other embodiments, and the same or similar parts between the various embodiments may be referred to another case. The described embodiments are only a part of the embodiments, rather than all of the embodiments of the present application. All other embodiments obtained by a person of ordinary skill in the art based on the embodiments of the present application without departing from the inventive skills are within the scope of the present application.

The above embodiments are merely used for illustrating rather than limiting the technical solutions of the present invention. Although the present application is described in detail with reference to the foregoing embodiments, those of ordinary skill in the art should understand that the technical solutions recorded in the foregoing embodiments may still be modified or equivalent replacement may be made on part or all of the technical features therein. These modifications or replacements will not make the essence of the corresponding technical solutions be departed from the scope of the technical solutions in the embodiments of the present invention.

It should be understood that the above descriptions are examples of the present invention, and that various alternatives of the invention described herein may be employed in practicing the invention. For example, the various modules can be implemented as cards. Thus, it is intended that the following claims define the scope of the invention and that structures and methods within the scope of these claims and their equivalents be covered thereby.

What is claimed is:

1. A processing system comprising:
a plurality of external memory units, each of the plurality of external memory units having:
an extension memory having a first plurality of memory addresses;
an interconnect circuit having a second plurality of memory addresses, the interconnect circuit having an extension controller and a number of ports coupled to the extension controller, each port of a first external memory unit being coupled to another external memory unit of the plurality of external memory units, and assigned a range of memory addresses within the second plurality of memory addresses; and
a memory control circuit coupled to the extension memory and the interconnect circuit, the memory control circuit to receive a memory request having a memory address, determine whether the memory address lies within the first plurality of memory addresses or within the second plurality of memory addresses, forward the memory address to the extension memory when the memory address lies within the first plurality of memory addresses, and forward the memory address to the interconnect circuit when the memory address lies within the second plurality of memory addresses,
the extension controller of the interconnect circuit to receive the memory address when the memory address lies within the second plurality of memory addresses, determine a port of the number of ports that was assigned the range of addresses that include the memory address, and forward the memory address to the port.

2. The processing system of claim 1, further comprising a plurality of general-purpose graphic processor units (GPGPUs) corresponding to the plurality of external memory units such that each GPGPU is coupled to a corresponding external memory unit.

3. The processing system of claim 2, wherein a first GPGPU only outputs memory requests to the external memory unit that corresponds with the first GPGPU.

4. The processing system of claim 3, wherein the first GPGPU can access data stored in the external memory unit that corresponds with a second GPGPU.

5. The processing system of claim 1, wherein the plurality of external memory units stores only GPGPU program instructions and values.

6. The processing system of claim 2, further comprising:
a system bus coupled to the plurality of GPGPUs and the plurality of external memory units, an external memory unit to receive the memory request from a GPGPU of the plurality of GPGPUs via the system bus;
an internal bus coupled to the memory control circuit, the extension memory, and the interconnect circuit; and
an interconnect structure coupled to the plurality of external memory units, the interconnect structure not being connected to any GPGPUs of the plurality of GPGPUs.

7. The processing system of claim 6, wherein:
the system bus includes a peripheral component interconnect express (PCIe) bus;
the internal bus includes an advanced extensible interface (AXI) bus; and
the interconnect structure includes fiber optic.

8. A method of operating a processing system, the method comprising:
receiving a memory request having a memory address by an external memory unit of the processing system;
determining whether the memory address lies within a first plurality of memory addresses associated with an extension memory of the external memory unit or within a second plurality of memory addresses associated with an interconnect circuit;
forwarding the memory address to the extension memory when the memory address lies within the first plurality of memory addresses, and forwarding the memory address to the interconnect circuit when the memory address lies within the second plurality of memory addresses;
receiving the memory address when the memory address lies within the second plurality of memory addresses;
determining a port of a plurality of ports that was assigned a range of addresses that include the memory address; and
forwarding the memory address to the port.

9. The method of claim 8, wherein the memory request is received by the external memory unit of a plurality of external memory units from a general-purpose graphic processor unit (GPGPU) of a corresponding plurality of GPGPUs that are coupled to the plurality of external memory units.

10. The method of claim 9, wherein a first GPGPU only outputs memory requests to the external memory unit that corresponds with the first GPGPU.

11. The method of claim 10, wherein the first GPGPU can access data stored in the external memory unit that corresponds with a second GPGPU.

12. The method of claim 9, wherein the plurality of external memory units stores only GPGPU program instructions and values.

13. The method of claim 9, further comprising:
receiving the memory request from a GPGPU of the plurality of GPGPUs via a system bus, the system bus being coupled to the plurality of GPGPUs and the plurality of external memory units;
coupling together a memory control circuit, the extension memory, and the interconnect circuit with an internal bus; and
coupling together the plurality of external memory units with an interconnect structure, the interconnect structure not being connected to any GPGPUs of the plurality of GPGPUs.

14. The method of claim 13, wherein:
the system bus includes a peripheral component interconnect express (PCIe) bus;
the internal bus includes an advanced extensible interface (AXI) bus; and
the interconnect structure includes fiber optic.

15. A non-transitory computer-readable storage medium having embedded therein program instructions, which when executed by one or more processors of a device, causes the device to execute a method that operates a processing system, the method comprising:
receiving a memory request having a memory address by an external memory unit of the processing system;
determining whether the memory address lies within a first plurality of memory addresses associated with an extension memory of the external memory unit or within a second plurality of memory addresses associated with an interconnect circuit;
forwarding the memory address to the extension memory when the memory address lies within the first plurality of memory addresses, and forwarding the memory address to the interconnect circuit when the memory address lies within the second plurality of memory addresses;
receiving the memory address when the memory address lies within the second plurality of memory addresses;
determining a port of a plurality of ports that was assigned a range of addresses that include the memory address; and
forwarding the memory address to the port.

16. The medium of claim 15, wherein the memory request is received by the external memory unit of a plurality of external memory units from a general-purpose graphic processor unit (GPGPU) of a corresponding plurality of GPGPUs that are coupled to the plurality of external memory units.

17. The medium of claim 16, wherein a first GPGPU only outputs memory requests to the external memory unit that corresponds with the first GPGPU.

18. The medium of claim 17, wherein the first GPGPU can access data stored in the external memory unit that corresponds with a second GPGPU.

19. The medium of claim 16, wherein the plurality of external memory units stores only GPGPU program instructions and values.

20. The medium of claim 16, further comprising:
receiving the memory request from a GPGPU of the plurality of GPGPUs via a system bus, the system bus being coupled to the plurality of GPGPUs and the plurality of external memory units;
coupling together a memory control circuit, the extension memory, and the interconnect circuit with an internal bus; and
coupling together the plurality of external memory units with an interconnect structure, the interconnect structure not being connected to any GPGPUs of the plurality of GPGPUs.

* * * * *